US011558937B2

(12) United States Patent
Zhao et al.

(10) Patent No.: US 11,558,937 B2
(45) Date of Patent: Jan. 17, 2023

(54) TRANSPARENT CONDUCTIVE DOOR FOR A MICROWAVE OVEN AND METHODS OF MAKING THE SAME

(71) Applicant: Whirlpool Corporation, Benton Harbor, MI (US)

(72) Inventors: Hongzhen Zhao, Shenshen (CN); Muhammad Khizar, Benton Harbor, MI (US); Ermanno Buzzi, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 1057 days.

(21) Appl. No.: 16/313,214

(22) PCT Filed: Jan. 20, 2017

(86) PCT No.: PCT/CN2017/071853
§ 371 (c)(1),
(2) Date: Dec. 26, 2018

(87) PCT Pub. No.: WO2018/133021
PCT Pub. Date: Jul. 26, 2018

(65) Prior Publication Data
US 2019/0159303 A1    May 23, 2019

(51) Int. Cl.
*H05B 6/76*        (2006.01)
*B82Y 99/00*       (2011.01)
*B82Y 40/00*       (2011.01)

(52) U.S. Cl.
CPC .............. *H05B 6/766* (2013.01); *B82Y 99/00* (2013.01); *H05B 6/76* (2013.01); *B82Y 40/00* (2013.01)

(58) Field of Classification Search
CPC ...... H05B 6/766; H05B 6/76; H05B 2214/04; B82Y 99/00; B82Y 40/00
See application file for complete search history.

(56) References Cited

U.S. PATENT DOCUMENTS 9,334,167 B2 *   5/2016  Silva ...................... C23C 16/46
2004/0198096 A1  10/2004  Kim et al.
(Continued)

FOREIGN PATENT DOCUMENTS

CN    101222840 A    7/2008
CN    101265037 A    9/2008
(Continued)

OTHER PUBLICATIONS

Extended European Search Report, European Patent Application No. 17892588.9, European Patent Office, dated Jul. 30, 2020, 7 pages.
(Continued)

*Primary Examiner* — Jonathan Han
(74) *Attorney, Agent, or Firm* — Price Heneveld LLP

(57) ABSTRACT

A door (100) for a microwave oven (200) is provided that includes: a door frame (102); a substantially transparent, glass or polymeric substrate (10) arranged within the frame (102) to define a viewing window (50); and an electrically conductive mesh (90) spanning the viewing window (50). Further, the mesh (90) comprises a plurality of carbon nanotubes and is embedded in the substrate (10) to shield the microwave radiation generated in the oven (200) from reaching an exterior of the door frame (102).

20 Claims, 2 Drawing Sheets

(56) References Cited

U.S. PATENT DOCUMENTS

| | | | | |
|---|---|---|---|---|
| 2010/0188833 | A1* | 7/2010 | Liang | H01B 1/04 |
| | | | | 252/502 |
| 2017/0047139 | A1* | 2/2017 | Al-Ghamdi | C23C 14/325 |
| 2018/0220501 | A1* | 8/2018 | Jung | C08J 7/046 |
| 2019/0074142 | A1* | 3/2019 | Gartia | H01G 11/32 |

FOREIGN PATENT DOCUMENTS

| | | |
|---|---|---|
| CN | 101466252 A | 6/2009 |
| CN | 102417610 A | 4/2012 |
| CN | 105042654 A | 11/2015 |
| CN | 204987134 U | 1/2016 |
| FR | 2976651 A1 | 12/2012 |
| WO | 2013092477 A1 | 6/2013 |
| WO | 2015145355 A1 | 10/2015 |

OTHER PUBLICATIONS

International Search Authority; International Search Report in Application No. PCT/CN2017/071853 dated Oct. 23, 2017; 13 pages; Beijing, China.

* cited by examiner

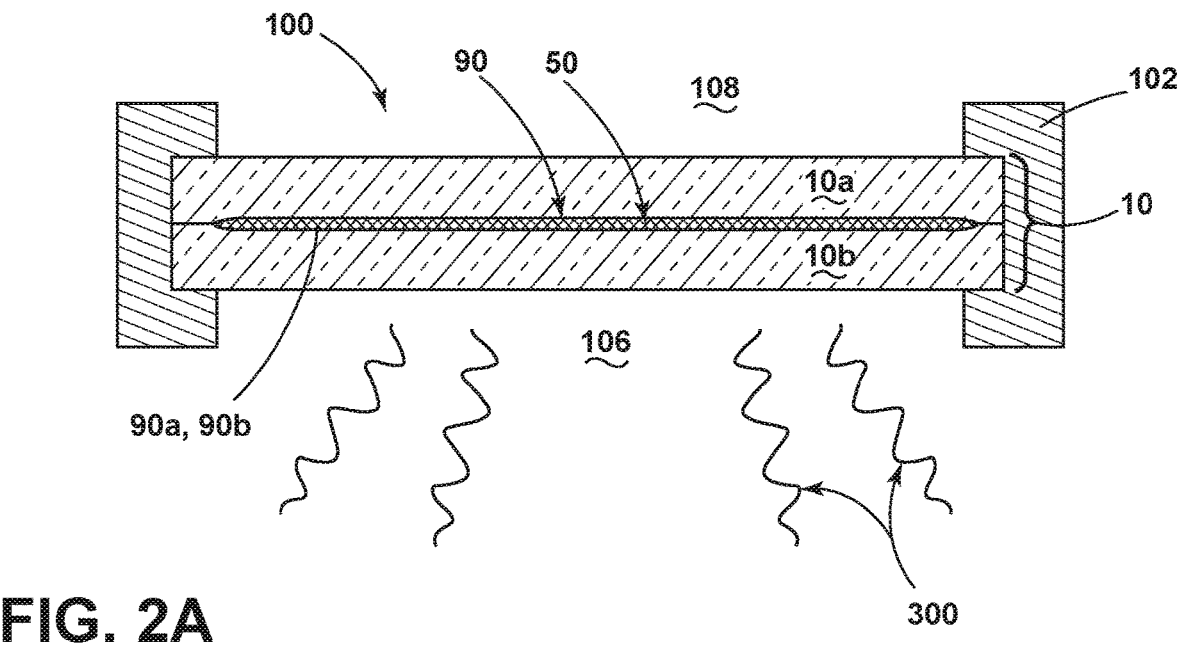
FIG. 2A
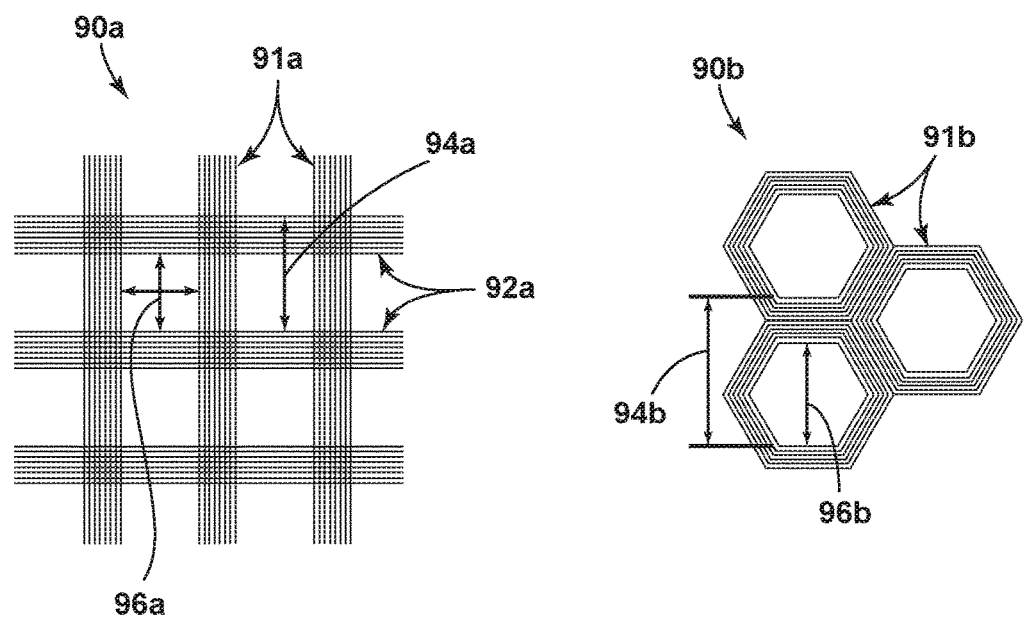
FIG. 3A
FIG. 3B

TRANSPARENT CONDUCTIVE DOOR FOR A MICROWAVE OVEN AND METHODS OF MAKING THE SAME

CROSS-REFERENCE TO RELATED APPLICATION

This application claims priority under 35 U.S.C. § 371 to International Application No. PCT/CN2017/071853, filed on Jan. 20, 2017, entitled "TRANSPARENT CONDUCTIVE DOOR FOR A MICROWAVE OVEN AND METHODS OF MAKING THE SAME," the disclosure of which is hereby incorporated herein by reference in its entirety.

TECHNICAL FIELD

The disclosure generally relates to optically transparent doors for appliances and other devices utilizing microwave radiation, including microwave ovens, and methods for making them.

BACKGROUND OF THE INVENTION

Microwave ovens, and other appliances that rely on microwave radiation, operate to cook and heat foots by exploiting the interaction between microwaves and various molecules within the food. These high energy waves penetrate into the food, causing its water molecules to vibrate and generate heat within the food to cook it quickly, at least as compared to other cooking devices (e.g., ovens that rely on resistance heating). Typically, microwave ovens employ microwave energy at a frequency of about 2.45 GHz, with a wavelength of about 12 cm and a corresponding quantum energy of about $1 \times 10^{-5}$ eV.

Given the energy levels associated with microwave radiation and their damaging effect on humans, pets and other animals, oven designers have developed various approaches to shielding the radiation within the confines of the oven. It is known that employing conductive materials, e.g., metal or metallized layers, in the cabinet of these ovens can prevent leakage of microwave radiation outside of the oven. Nevertheless, consumers also desire to view the food during and after the cooking process; consequently, employing a solid, continuous metal layer in the door of these ovens is not an acceptable solution.

Some moderately successful results have been obtained in developing a microwave oven door that can shield microwave radiation while remaining sufficiently transparent to allow for viewing of food within the oven. These conventional microwave oven doors typically employ metal screens within a translucent glass or plastic door. More particularly, these screens (and similar structures) are visible to the consumer, but are characterized by holes on the order of a few millimeters or less (e.g., about 0.2 mm to about 2 mm) that allow for viewing of food within the cabinet of the microwave oven. While conventional microwave oven doors with shielding screens are widely in use today, they suffer from the fact that the consumers can observe the shielding screens within the door and that the screens partially obscure the food during and after the cooking process. With continuous or repeated use, these conventional over doors can be prone to further light blockage from food and debris adherence, leading to further cooling difficulties.

Accordingly, there is a need for optically transparent doors for appliances and other devices utilizing microwave radiation, including microwave ovens, and methods for making them. Given the relatively low cost of microwave ovens, and the expectations of consumers of these low costs, there is also a need for configurations of these doors, and methods of making them, that do not significantly increase overall cost of the ovens.

BRIEF SUMMARY OF THE INVENTION

According to a first aspect of the disclosure, a door for a microwave oven is provided that includes: a door frame; a substantially transparent, glass or polymeric substrate arranged within the frame to define a viewing window; and an electrically conductive mesh spanning the viewing window. Further, the mesh comprises a plurality of carbon nanotubes and is embedded in the substrate to shield the microwave radiation generated in the oven from reaching an exterior of the door frame.

According to a second aspect of the disclosure, the door of aspect 1 is provided, wherein the mesh comprises a first plurality of carbon nanotube wires and a second plurality of carbon nanotube wires, and further wherein the first and the second plurality of carbon nanotube wires are arranged substantially perpendicular to one another.

According to a third aspect of the disclosure, the door of aspect 2 is provided, wherein the carbon nanotubes range in diameter from about 20 nm to about 100 nm and in length from about 100 nm to about 100 cm.

According to a fourth aspect of the disclosure, the door of aspect 1 is provided, wherein the mesh comprises a honeycomb-shaped structure.

According to a fifth aspect of the disclosure, the door of aspect 4 is provided, wherein the honeycomb-shaped structure has a pitch of about 300 nm to 600 nm and a hole diameter of about 50 nm to about 150 nm.

According to a sixth aspect of the disclosure, the door of aspect 4 or aspect 5 is provided, wherein the carbon nanotubes are in the form of wires that range in diameter from about 50 nm to about 100 nm and in length from about 100 nm to about 100 cm.

According to a seventh aspect of the disclosure, the door of any one of aspects 1-6 is provided, wherein the carbon nanotubes comprise one or more layers of graphene.

According to an eighth aspect of the disclosure, the door of any one of aspects 1-7 is provided, wherein the door is further characterized by an optical transmissivity of 85% or greater in the visible spectrum.

According to a ninth aspect of the disclosure, the door of any one of aspects 1-7 is provided, wherein the door is further characterized by an optical transmissivity of 95% or greater in the visible spectrum.

According to a tenth aspect of the disclosure, a microwave oven is provided that includes an oven cabinet; and a door according to any one of aspects 1-9, wherein the door frame is movably coupled to the oven cabinet and the microwave radiation is generated within the cabinet.

According to an eleventh aspect of the disclosure, a method of making a door for a microwave oven is provided that includes: arranging a plurality of carbon nanotubes into an electrically conductive mesh; forming a substantially transparent, glass or polymeric substrate; embedding the electrically conductive mesh within the substrate; and arranging the substrate within a door frame to define a viewing window. Further, the electrically conductive mesh is configured within the substrate to shield microwave radiation generated in the oven from reaching an exterior of the door frame.

According to a twelfth aspect of the disclosure, the method of aspect 12 is provided, wherein the substrate comprises a first substrate element and a second substrate element, and further wherein the arranging is conducted such that the electrically conductive mesh is disposed over the first substrate element, and the embedding is conducted such that the second substrate element is disposed over the electrically conductive mesh, sandwiching the mesh between the first and second substrate elements.

According to a thirteenth aspect of the disclosure, the method of aspect 11 or aspect 12 is provided, wherein the arranging comprises applying an electric field to align the plurality of carbon nanotubes into an electrically conductive mesh.

According to a fourteenth aspect of the disclosure, the method of any one of aspects 11-13 is provided, wherein the mesh comprises a first plurality of carbon nanotube wires and a second plurality of carbon nanotube wires, and further wherein the first and the second plurality of carbon nanotube wires are arranged substantially perpendicular to one another and comprise one or more walls.

According to a fifteenth aspect of the disclosure, the method of any one of aspect 11 or aspect 12 is provided, wherein the mesh comprises a honeycomb-shaped structure.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention there are shown in the drawings certain embodiment(s) which are presently preferred. It should be understood, however, that the invention is not limited to the precise arrangements and instrumentalities shown. Drawings are not necessarily to scale. Certain features of the invention may be exaggerated in scale or shown in schematic form in the interest of clarity and conciseness.

FIG. 2A is a cross-sectional view of the door depicted in FIG. 2 along line IIA-IIA.

FIG. 3A is an enlarged, schematic view of an electrically conductive mesh embedded within a door as depicted in FIGS. 2 and 2A, according to an aspect of the disclosure.

FIG. 3B is an enlarged, schematic view of an electrically conductive mesh embedded within a door as depicted in FIGS. 2 and 2A, according to another aspect of the disclosure.

DETAILED DESCRIPTION

Figure 1:
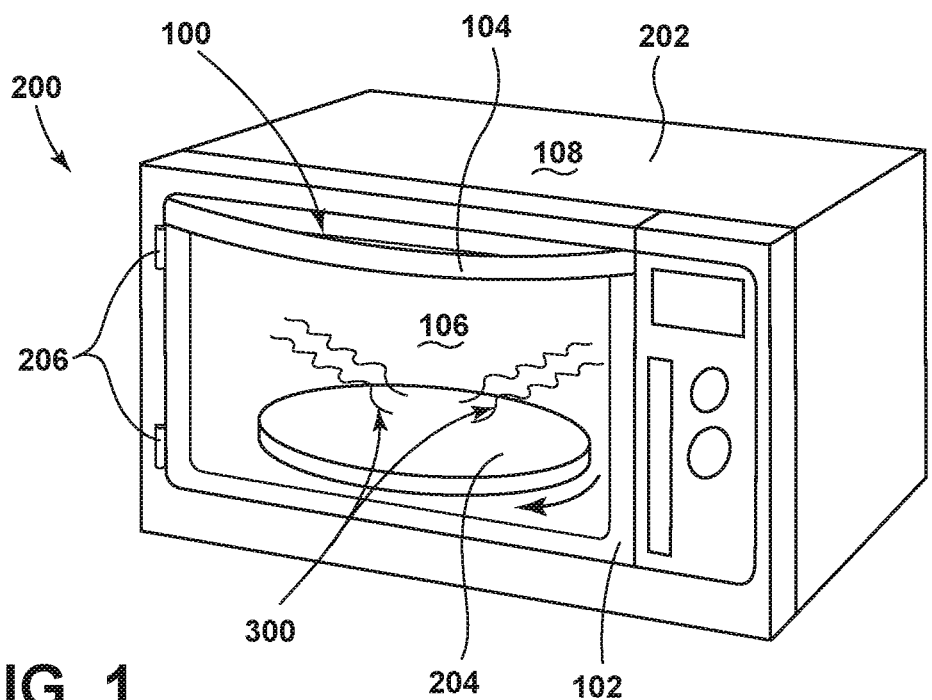
FIG. 1 is a schematic, perspective view of a microwave oven with an optically transparent door according to an aspect of the disclosure.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include the plural reference unless the context clearly dictates otherwise.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Various embodiments of doors for appliances employing microwave radiation, including microwave ovens, are detailed in the following disclosure in exemplary form. These doors are substantially transparent in terms of light transmissivity within the visible spectrum. These doors also have the capability to shield the exterior environment of the appliance from microwave radiation leakage, comparable to, or better than, the shielding afforded by conventional microwave oven doors. Advantageously, these doors are substantially transparent in the visible spectrum such that an electrically conductive mesh embedded within the door is not readily visible and food contained within the appliance having the door can be viewed.

As used herein, the terms "substantially transparent," "optically transparent," "transparent," and "see-through" are interchangeable. Further, these terms can refer to door embodiments of the disclosure (e.g., for appliances that employ microwave radiation), and substrates configured within these doors, having light transmissivity in the visible spectrum (about 400 to 800 nm) of at least 70%.

As also used herein, the terms "substantially invisible" and "invisible" are interchangeable and refer to embodiments of doors of the disclosure having internal features, such as an electrically conductive mesh, that are invisible to the unaided eye under ambient lighting conditions.

Referring now to FIG. 1, a microwave oven 200 with a door 100 is depicted in exemplary form according to an aspect of the disclosure. The microwave oven includes a cabinet 202 that houses a microwave heating cavity in its interior 106 which generates microwave radiation 300. The microwave radiation 300 is configured, as understood by those with ordinary skill in the field, to have an appropriate wavelength (~2.45 GHz), energy and power density suitable for efficiently cooking food located on table 204. Further, the cabinet 202 is constructed of conventional materials suitable for use in the cabinet of an appliance that generates microwave radiation (e.g., metals, metal alloys, polymeric materials, and composites of these materials) including one or more metal layers, films or similar structures configured for shielding the radiation 300 from reaching the exterior 108 of the cabinet 202 and door frame 102. As also shown in exemplary form in FIG. 1, the table 204 can rotate during the cooking process. In addition, other embodiments of the microwave oven 100 are configured with a table 204 that is configured in a fixed position.

As also shown in FIG. 1, the door 100 of the microwave oven 200 includes a frame 104 and is movably attached to the cabinet 202 by a set of hinges 206. In particular, the hinges 206 couple the frame 102 of the door 100 to the cabinet 202. Further, the door 100 can, in some embodiments, include a handle 104 suitable for manual opening and closing of the door 100 to the cabinet 202. In other aspects of the microwave oven 200, the door 100 can be coupled to the cabinet in other configurations. For example, the door 100 can be movably coupled to the cabinet 202 such that it can slide open and closed by manual operation or with the operation of a motor activated by a user (not shown). As another example, the door 100 can be movably coupled to the cabinet 202 such that it can slide (e.g., as a drawer) open or closed by manual operation or with the operation of a motor activated by a user (not shown). Accordingly, the door 100 can be movably coupled to the cabinet 202 of the microwave oven 200 in various configurations, including others not detailed in the disclosure, but consistent with the principles outlined here.

Figure 2:
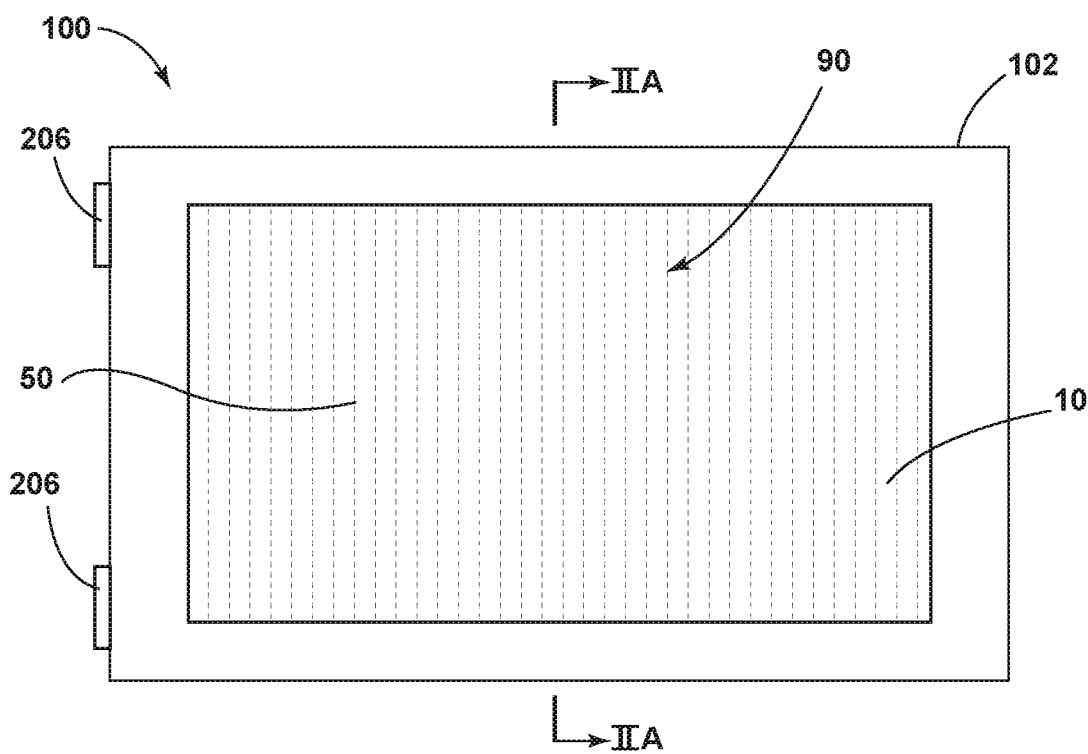
FIG. 2 is a schematic, plan view of an optically transparent door for a microwave oven according to an aspect of the disclosure.

Referring now to FIG. 2, a door 100 of the microwave oven 200 (see FIG. 1) is schematically depicted in exemplary form in a plan view. As noted earlier, the door 100 includes a door frame 102 and a substantially transparent substrate 10 that is fabricated from a glass or polymeric material. Further, the substrate 10 is fitted within the frame 102 such that it defines a viewing window 50. As also shown in FIG. 2, the door 100 includes an electrically conductive mesh 90 comprising carbon nanotubes ("CNTs") that spans the viewing window 50 within the frame 102. According to some aspects, the mesh 90 is located in close proximity to the edge of the viewing window 50, e.g., at the edge, or overlapping the edge flush with the outer edge of the frame 102 (not shown). Further, the electrically conductive mesh 90 is embedded within the substrate 10 and configured to shield microwave radiation 300 generated in the oven 200 within the interior 106 from reaching the exterior 108 (see FIG. 1). In some embodiments of the door 100, the electrically conductive mesh 90 is characterized by an electrical conductivity ranging from about $0.5 \times 10^6$ S*m and $10 \times 10^7$ S*m, preferably about $1 \times 10^6$ S*m and $1 \times 10^7$ S*m, and most preferably at about $1 \times 10^6$ S*m.

Further, according to some embodiments, the electrically conductive mesh 90 incorporated within the door 100 depicted in FIGS. 1 and 2 is substantially invisible. That is, the electrically conductive mesh 90, as embedded within the substrate 10, is not visible to the unaided eye under ambient lighting by a user of the oven 200 that is looking from the exterior 108 into the interior 106 through the viewing window 50. Accordingly, the components of the electrically conductive mesh 90, in these embodiments, including its carbon nanotubes, are dimensioned to ensure that the mesh 90 is substantially invisible. Hence, the mesh 90, as embedded within the substrate 10, can serve to provide shielding for the door 100 without the drawbacks of obscuring food located within the oven 200 during or after a cooking evolution.

In some implementations of the door 100 depicted in FIGS. 1 and 2, the door 100 is configured to be substantially transparent. That is, the door 100, as including its substrate 10 and electrically conductive mesh 90, can be characterized by a light transmissivity in the visible spectrum (about 400 to 800 nm) of at least 70%. Similarly, the substrate 10 employed by the door 100 can itself be characterized by a light transmissivity in the visible spectrum of at least 70%. In other implementations of the door 100, the door 100, as including the mesh 90 and substrate 10, and/or the substrate 10 by itself, can be characterized by a light transmissivity of at least 75%, at least 80%, at least 85%, at least 90%, at least 95%, and all transmissivity values between these lower threshold levels.

Referring now to FIG. 2A, a cross-sectional view of the door 100 depicted in FIG. 2 is shown along line IIA-IIA. In particular, the door 100 is shown with a substrate 10 arranged within the frame 102 to define a viewing window 50. Further, the door 100 is positioned and configured to shield microwave radiation 300 in the interior 106 (e.g., as generated in the interior 106 of a cabinet 202 of an oven 200, as shown in FIG. 1) from the exterior 108 of the door frame 102. According to some embodiments, the thickness of the substrate 10 is set between about 1 mm and about 20 mm, preferably between about 2 mm and about 10 mm, and most preferably between about 4 mm and 6 mm. As also shown in FIG. 2A, the electrically conductive mesh 90 comprising carbon nanotubes is embedded within the substrate 10. In some embodiments, the substrate 10 can comprise a first substrate element 10a and a second substrate element 10b with the electrically conductive mesh 90 arranged between these substrate elements.

As also shown in exemplary form in FIG. 2A, the electrically conductive mesh 90 embedded in the substrate 10 of the door 100 can be fabricated in various two- and three-dimensional structures comprising carbon nanotubes to afford the door 100 with the requisite microwave radiation shielding while maintaining substantial invisibility and transparency. These structures for the electrically conductive mesh 90 can include an X-Y weave 90a and a honeycomb-shaped structure 90b.

The CNTs employed in the electrically conductive mesh 90 of the door 100 shown in FIG. 2A can take on a variety of shapes and dimensions, according to some implementations of the disclosure. In some embodiments, the CNTs have an average diameter that ranges from about 0.5 nm to about 5 nm, preferably from about 1 nm to about 3 nm, and most preferably from about 0.9 nm to about 1.8 nm. In a preferred embodiment, the CNTs possess two distinct populations having mean diameters of 0.93 nm±0.03 nm and 1.64 nm±0.15 nm. Further, in some implementations, the CNTs have an average length from about 100 nm to 3 km; from about 100 nm to about 100 cm; from about 5 mm to 2.5 km; from about 5 mm to 1 m; from about 5 mm to 0.5 m; and all length values between these lengths. According to some aspects, the CNTs can be arranged in a wire, wire-like form, cable or comparable form in which quantities of CNTs are generally aligned (e.g., as in a fiber tow) or specifically aligned (e.g., braided) with one another into a larger form. In these embodiments, the CNT wires can range in diameter from about 50 nm to about 100 nm, preferably from about 25 nm to about 75 nm. In some implementations, the CNTs in wire or comparable form can be in single-wall, double-wall, few-wall or in multi-wall configurations; consequently the CNTs employed in the mesh 90 can possess multiple diameters.

Referring again to the CNTs employed in the electrically conductive mesh 90 of the door 100 shown in FIG. 2A, some CNTs, according to embodiments of the disclosure, are formed as seamless or substantially seamless cylinders comprising one or more layers of graphene. For example, a chemical vapor deposition (CVD) process can be employed to fabricate the CNTs of the disclosure according to conventional techniques and processes. These layers of graphene can possess open or closed ends that exhibit the expected mechanical, electrical and thermal properties associated with such CNTs by those with ordinary skill in the field of the disclosure. In preferred embodiments, the CNTs employed in the electrically conductive mesh 90 are configured such that all of their carbon atoms are bonded in a hexagonal lattice, except at their ends.

Referring now to FIG. 3A, an X-Y weave 90a of an electrically conductive mesh 90 (see FIG. 2A) can comprise a first plurality of carbon nanotube wires 91a and a second plurality of carbon nanotube wires 92a, each wire containing a substantial quantity of CNTs. Further, the first and second plurality of nanotube wires 91a and 92a are arranged substantially perpendicular to one another. That is, the first and second plurality of nanotube wires 91a, 92a can be configured to form an X-Y weave 90a in the form of a two-dimensional weave. To the extent that additional CNTs are added to the mesh 90 (see FIG. 2A) in the Z direction in wire form, also normal to the first and second plurality of CNT wires 91a, 92a, the weave 90a can be configured in the form of three-dimensional weave, according to some aspects of the disclosure. In addition, the X-Y weave 90a can be characterized by a pitch 94a and a hole size 96a (i.e., the largest dimension between the first and second plurality of CNT wires 91a, 92a as arranged normal to one another). In some embodiments of the X-Y weave 90a, the pitch 94a is set at about 1 mm to about 3 mm, and the hole size 96a is set at about 0.5 mm to about 2.5 mm. In a preferred embodiment of the X-Y weave 90a, the pitch 94a is set at about 1.5 mm to about 2.5 mm, and the hole size 96a is set at about 1 mm to about 2 mm.

Referring now to FIG. 3B, a honeycomb-shaped structure 90b of an electrically conductive mesh 90 (see FIG. 2A) can comprise a plurality of carbon nanotube wires 91b, each wire containing a substantial quantity of CNTs. Further, the plurality of carbon nanotube wires 91b are arranged into a substantially, two-dimensional hexagonal arrangement as shown in FIG. 3B in exemplary form. To the extent that additional CNTs are added to the mesh 90 in the Z direction in wire form, normal to the plurality of CNT wires 91b, the honeycomb structure 90b can be configured in the form of a three-dimensional structure according to some aspects of the disclosure. In addition, the honeycomb-shaped structure can be characterized by a pitch 94b and a hole size 96a (i.e., the largest dimension between the plurality of CNT wires 91b). In some embodiments of the honeycomb-shaped structure 90b, the pitch 94b is set at about 150 nm to about 750 nm, and the hole size 96b is set at about 50 nm to about 250 cm. In a preferred embodiment of the honeycomb structure 90b, the pitch 94b is set at about 300 mm to about 600 nm, and the hole size 96a is set at about 50 nm to about 150 nm.

According to another embodiment of the disclosure, a method of making a door 100 for a microwave oven 200 (see FIGS. 1-2A) is provided. The method includes various steps, which can be performed in the following sequence, or other sequences as understood by those with ordinary skill. In particular, the method can include a step of arranging a plurality of carbon nanotubes into an electrically conductive mesh 90; forming a substantially transparent, glass or polymeric substrate 10; and embedding the electrically conductive mesh 90 within the substrate 10. Further, the method can include arranging the substrate 10 within a door frame 102 to define a viewing window 50. Further, the electrically conductive mesh 90 is configured within the substrate 10 to shield microwave radiation 300 generated in the oven 200 (e.g., from within its interior 106) from reaching an exterior 108 of the door frame 102.

In another implementation of the method, the substrate 10 comprises a first substrate element 10a and a second substrate element 10b (see FIG. 2A), and the arranging is conducted such that the electrically conductive mesh 90 is disposed over the first substrate element 10a (or 10b), and the embedding is conducted such that the second substrate element 10b (or 10a) is disposed over the electrically conductive mesh 90, thus sandwiching the mesh 90 between the first and second substrate elements 10a, 10b. In some aspects of this embodiment, the substrate elements 10a and 10b are fabricated from glass materials; and the mesh 90 is embedded between them using a glass sealing process, e.g., by heating a glass frit disposed between the substrates around the circumference of the mesh 90 to an appropriate temperature to promote sealing of the substrate elements. In other aspects of this embodiment, the substrate elements 10a and 10b are fabricated from polymeric materials; and the mesh 90 is embedded between them by hot pressing the substrate elements 10a, 10b together at an appropriate temperature to ensure flow and sealing of the elements 10a, 10b at the circumference of the mesh 90 (e.g., beneath the frame 102 as shown in FIG. 2A).

According to another aspect of the disclosure, the method of making a door 100 (see FIG. 2) can be conducted such that the arranging comprises applying an electric field to align the plurality of carbon nanotubes and those of nanotube wires (see, e.g., 91a, 92a, 91b as shown in FIGS. 3A and 3B) into an electrically conductive mesh 90 (see FIG. 2A) or particular mesh structure, such as an X-Y weave 90a or honeycomb-shaped structure 90b (FIGS. 3A and 3B). As the CNTs employed in the electrically conductive mesh 90 are electrically conductive, an appropriate electric field can be applied to an arrangement of them on a particular substrate 10 or a substrate element (see, e.g., substrate elements 10a, 10b as shown in FIG. 2A) to align them consistent with the applied electric field. Once the CNTs have been ordered into a desired location and arrangement on the substrate, the applied electric field can be removed, and then the CNTs can be fixed in place (e.g., by a glue, or other material compatible with the glass or polymeric material selected for the substrate 10). At this point, another applied electric field can be applied to orient additional CNTs in another direction (e.g., perpendicular to the ordered CNTs from the prior step), and then these CNTs can be fixed in place with a similar process. Accordingly, this approach can be employed to fabricate an electrically conductive mesh 90 having a variety of shape factors, including the X-Y weave 90a and honeycomb-shaped structure 90b depicted in FIGS. 3A and 3B, respectively.

Many variations and modifications may be made to the above-described embodiments of the disclosure without departing substantially from the spirit and various principles of the disclosure. For example, the principles associated with the methods of making a liner and the liner configurations of the disclosure can be employed in fabricating liners for use in various appliances, such as portable refrigerators, coolers, storage containers, etc. These methods and liner configurations can also be applied in the development of exterior surfaces of various appliances and other household items with various design aesthetics and coloration features. All such modifications and variations are intended to be included herein within the scope of this disclosure and protected by the following claims.

The invention claimed is:

1. A door for a microwave oven, comprising:
a door frame;

a substantially transparent, glass or polymeric substrate arranged within the frame to define a viewing window; and an electrically conductive mesh spanning the viewing window, wherein the mesh comprises a plurality of carbon nanotubes forming a two-dimensional weave and is embedded in the substrate to shield microwave radiation generated in the oven from reaching an exterior of the door frame, wherein the mesh comprises additional carbon nanotubes placed such that the mesh is configured in the form of a three-dimensional structure, and further wherein the plurality of carbon nanotubes have an average diameter that ranges from about 0.9 nm to about 1.8 nm.

2. The door according to claim 1, wherein the mesh comprises a first plurality of carbon nanotube wires and a second plurality of carbon nanotube wires, and further wherein the first and the second plurality of carbon nanotube wires are arranged substantially perpendicular to one another.

3. The door according to claim 1, wherein the plurality of carbon nanotubes possesses two distinct populations having diameters of 0.93 nm±0.03 nm and 1.64 nm±0.1 nm, and further wherein the mesh is located so as to overlap an edge flush with an outer edge of the frame.

4. The door according to claim 1, wherein the mesh comprises a honeycomb-shaped structure.

5. The door according to claim 4, wherein the honeycomb-shaped structure has a pitch of about 300 nm to 600 nm and a hole diameter of about 50 nm to about 150 nm.

6. The door according to claim 1, wherein the carbon nanotubes are in the form of wires that range in diameter from about 50 nm to about 100 nm and in length from about 100 nm to about 100 cm.

7. The door according to claim 6, wherein the carbon nanotubes comprise one or more layers of graphene.

8. The door according to claim 1, wherein the door is further characterized by an optical transmissivity of 85% or greater in the visible spectrum.

9. The door according to claim 1, wherein the door is further characterized by an optical transmissivity of 95% or greater in the visible spectrum.

10. A microwave oven, comprising:

an oven cabinet; and a door according to claim 1, wherein the door frame is movably coupled to the oven cabinet and the microwave radiation is generated within the cabinet.

11. A method of making a door for a microwave oven, comprising:

arranging a plurality of carbon nanotubes into an electrically conductive mesh, forming a two-dimensional weave;

forming a substantially transparent, glass or polymeric substrate;

embedding the electrically conductive mesh within the substrate; and arranging the substrate within a door frame to define a viewing window, wherein the electrically conductive mesh is configured within the substrate to shield microwave radiation generated in the oven from reaching an exterior of the door frame, wherein the mesh comprises additional carbon nanotubes placed such that the mesh is configured in the form of a three-dimensional structure, and further wherein the plurality of carbon nanotubes have an average diameter that ranges from about 0.9 nm to about 1.8 nm.

12. The method according to claim 11, wherein the substrate comprises a first substrate element and a second substrate element, and further wherein the arranging is conducted such that the electrically conductive mesh is disposed over the first substrate element, and the embedding is conducted such that the second substrate element is disposed over the electrically conductive mesh, sandwiching the mesh between the first and second substrate elements.

13. The method according to claim 11, wherein the arranging comprises applying an electric field to align the plurality of carbon nanotubes into an electrically conductive mesh.

14. The method according to claim 11, wherein the mesh comprises a first plurality of carbon nanotube wires and a second plurality of carbon nanotube wires, and further wherein the first and the second plurality of carbon nanotube wires are arranged substantially perpendicular to one another and comprise one or more walls.

15. The method according to claim 11, wherein the mesh comprises a honeycomb-shaped structure.

16. A door for a microwave oven, comprising:

a door frame;

a substantially transparent substrate arranged within the frame to define a viewing window; and an electrically conductive mesh spanning the viewing window, wherein the mesh comprises a plurality of carbon nanotubes forming a two-dimensional weave and is embedded in the substrate to shield microwave radiation generated in the oven from reaching an exterior of the door frame, wherein the mesh comprises additional carbon nanotubes placed such that the mesh is configured in the form of a three-dimensional structure, and further wherein the plurality of carbon nanotubes have an average diameter that ranges from about 0.9 nm to about 1.8 nm.

17. The door according to claim 16, wherein the mesh comprises a first plurality of carbon nanotube wires and a second plurality of carbon nanotube wires, and further wherein the first and the second plurality of carbon nanotube wires are arranged substantially perpendicular to one another.

18. The door according to claim 16, wherein the plurality of carbon nanotubes possesses two distinct populations having diameters of 0.93 nm±0.03 nm and 1.64 nm±0.1 nm, and further wherein the mesh is located so as to overlap an edge flush with an outer edge of the frame.

19. The door according to claim 16, wherein the mesh comprises a honeycomb-shaped structure.

20. The door according to claim 19, wherein the honeycomb-shaped structure has a pitch of about 300 nm to 600 nm and a hole diameter of about 50 nm to about 150 nm.

* * * * *